Patented Oct. 28, 1941

2,260,499

UNITED STATES PATENT OFFICE 2,260,499

APPLICATION OF MUD-LADEN OR DRILLING FLUIDS

Frederick B. Williams, Los Angeles, Calif., assignor to National Lead Company, Los Angeles, Calif., a corporation of New Jersey No Drawing. Application May 16, 1938, Serial No. 208,230

6 Claims. (Cl. 252—8.5)

This invention relates to mud-laden or drilling fluids and more particularly to their application to oil or gas wells.

A mud-laden fluid is used in the drilling or boring of oil or gas wells or for the control of oil or gas wells. In rotary drilling the mud-laden fluid is introduced through the drill pipe passing out through the holes in the bit into the bore-hole to rise in the same. The mud-laden fluid acts as a lubricant, cooling agent for the bit and carries out cuttings. Such a fluid also performs the function of "mudding off"; that is, walling the bore-hole, as well as holding down the pressure, by its weight.

The ordinary mud-laden fluid is made up from clay obtainable at the well. In some cases, however, clay is transported from special deposits and used at the well. The specific gravity obtainable with ordinary clays is, however, limited, the usual limit being 1.2, for beyond that the viscosity will exceed that permissible to prevent gas cutting. While the specific gravity can be increased by the use of viscosity reducing agents, the increase in specific gravity is not sufficient to meet the requirements. Moreover the colloidal content of ordinary clay, and even of special clays, is rather low, and in many cases it is not sufficient to permit the fluid to function properly.

In the Stroud Patent No. 1,575,945, March 9, 1926, is described the application of a mud-laden fluid to oil or gas wells, in which application the density of the fluid is varied by the addition of quantities of such heavy suspendable substances (called "mud-weighting materials") as barytes (barium sulphate), ferric oxide ($Fe_2O_3$), or plumbic oxide (PbO), the barytes, or ferric oxide, or plumbic oxide being ordinarily used as an admixture to ordinary mud as obtainable at the well, to impart the necessary weight to the fluid and at the required limited viscosity.

In the Harth Patent No. 1,991,637, February 19, 1935, is described the application to a mud-laden fluid of a concentrated colloidal suspending agent, such as a material containing a high percentage of colloidal particles, known as bentonite and classified by some authorities as emulsoid colloids. When added to ordinary drilling fluids it increases the colloidal content for such a fluid. It also provides a suitable suspending agent for mud weighting material, such as barytes, or ferric oxide or plumbic oxide; these materials when added to a mud-laden fluid form a suspension of the particles of the weighting material in the fluid.

The forming of the suspension is not difficult, but the maintenance of the suspension is more difficult. It is important in the drilling of an oil or gas well, that the suspendable base or the weighting material be prevented from settling out, or the precipitated particles will stick or "freeze" the drill pipe, particularly if the operation of drilling the well or circulating the fluid is interrupted. This settling also interferes with the landing or setting of casing, often necessitating drilling out of the settled material. Furthermore, settling interferes with circulation to all parts of the bore-hole and causes some of the fluid in the column to be of lower specific gravity than in other parts of the column, so that it may not perform its function of "mudding off" the bore-hole and holding down pressures. Settling also increases the cost of maintenance and the pumping difficulties.

As described in the Harth patent the concentrated colloidal clay and weighting material are mixed dry in the proportion of from 2 to 5% of the colloidal clay and 98 to 95% of barytes. By incorporating this mixture in water in the desired proportion a mud-laden fluid will be formed in which the weighting material will remain in suspension practically indefinitely. It was found that by the employment of the concentrated colloidal clay in the manner described, it will act as a suspending agent so as to keep the suspendable base in water or in the mud as found at oil or gas wells. While suspensions made from the admixture of clay of high colloidal content and barytes or ferric oxide or plumbic oxide that will remain in suspension practically indefinitely, there are a limited number of such suspensions that will remain so. As an example, a mud-laden fluid of weight 103 lbs. per cubic foot made up from a mixture of 2% of clay of high colloidal content and 98% of barytes and water (such mixture having been made under the method described in the Harth patent) will allow some settling of the suspendable base. In a column of this fluid containing 100 cubic centimeters and 18 cm. high there was found at the top a column of free water 35 cubic centimers in volume at the end of 24 hours of uncontrolled settling. To overcome this under the Harth patent, additional clay of high colloidal content must be incorporated in the barytes or added thereto, with additional cost. This is true also of other suspensions than the one above named. These conditions are also encountered when a concentrated colloidal suspending agent is employed in an ordinary mud-laden or drilling fluid, containing ordinary clay as a base.

One of the objects of my invention is to make available a method for obtaining a better suspension of the suspendable base in mud-laden fluids used in oil or gas wells.

Another object is to increase the number of possible suspensions that will remain in suspension practically indefinitely.

Another object is to decrease the percentage of clay of high colloidal content necessary to form a suspension of a suspendable base in a mud-laden fluid of any given weight which will remain in suspension practically indefinitely.

Further objects are to provide a novel material for a mud-laden fluid, a novel mud-weighting material, a novel mud-laden or drilling fluid and novel processes of preparing and employing such material and fluid.

Further objects will appear from the detail description in which will be described an illustrative practical embodiment of this invention; it will be understood, however, that this invention is susceptible of various other embodiments.

In accordance with this invention, a material for a mud-laden fluid is provided which comprises a suspendable base, the particles of which are coated with a water wettable agent and more particularly with a concentrated colloidal suspending agent. The suspendable base may be of clay or a non-colloidal material such as amorphous silica; it may, however, be a mud-weighting material, such as barytes, iron oxide, lead oxide etc. This material is produced by treating the suspendable base with the agent so as to incorporate the same with the particles of the base in such a manner as to secure a coating effect. The material can be added to water so as to hydrate the material and secure a mud-laden or drilling fluid which can then be introduced into the well. The material can, however, be added to drilling fluids, whether comprising ordinary clay, or a mud-weighting material, or a concentrated colloidal suspending agent or any combination of them.

An example of the practice of this invention, if it is desired to obtain a mud-laden fluid in which the suspendable base is barytes and the dispersion medium water, the concentrated colloidal clay and barytes are mixed together with the water in the wet state in the proportion of 2 to 5% of the colloidal clay and 98 to 95% of barytes to form a suspension of the powdered material in the aqueous suspension medium; drying the whole at 105 degrees centigrade, and reducing the product therefrom to a pulverulent state. A powdered material made up by the described process containing 2% of clay of high colloidal content and 98% of barytes made up in proper proportions with water will give a fluid weighing 103 pounds per cubic foot. In a column of this particular fluid mixture or suspension 100 centimeters in height there was found at the top a column of free water 10 cubic centimeters in volume at the end of 24 hours of uncontrolled settling.

The barytes particles are apparently not as easily wetted by water as are particles of colloidal clay, therefore by coating the barytes particles with clay of high colloidal content, a particle which contains the suspendable base is made more easily wetted by water, and accordingly those particles more easily wetted by water are capable of remaining in suspension for a longer period than those not so easily wetted by water.

The same procedure may be employed by the application of the agent to any other mud-weighting material, such as iron oxide, lead oxide, etc. The same procedure may also be employed to apply the agent to amorphous silica. The same procedure may also be employed to apply the agent to ordinary clay after it has been dried and pulverized, or before drying followed by drying and pulverizing.

Other suitable concentrated colloidal suspending agents and more particularly emulsoid colloids may, however, be employed under this invention or improvement to attain the features of this invention. Examples of these are starch, gelatin, sodium silicate solutions, gum tragacanth, agar, casein glue, albumin, soybean glue, and other similar substances, all of which act as suspending agents upon the bases which may be used in mud-laden fluids.

It is found that by the employment of the concentrated colloidal clay in the manner described in my invention, it will act as an improved suspending agent to keep a suspendable base in suspension in water, or in mud found at oil or gas wells practically indefinitely. It can be seen that in accordance with the described embodiments of this invention there is an increased number of possible suspensions of a suspendable base in water or mud-laden fluid using a clay of high colloidal content. This invention produces an unexpected result. It allows the same result obtained under the Harth patent but allows the use of smaller quantities of colloidal clay to obtain the same result.

The material so produced is one which may be furnished in dry comminuted form, either in sacks or barrels. The hydration of the material may be accomplished by the procedure usually employed in the hydration of other bases, such as mud-weighting materials, bentonite and clay, in order to form a mud-laden or drilling fluid. The material may be added to drilling fluids already in the well or in the slush pit, whether they are the ordinary mud-laden fluids containing clay, or contain a mud weighting material or bentonite or both. In such a case it is well to preliminarily hydrate the material.

It is to be understood that while a theory of operation has been advanced it is not the only or necessary one, but has been advanced to facilitate the disclosure. Thus while in the description and in the claims it is stated that the suspendable base is "coated" with the agent, this expression coated is description rather than limitative so as to distinguish from the prior practice in which, for instance, bentonite was simply mixed with a mud-weighting material in a dry state and the whole hydrated. It is further understood that this invention is not limited to any theory of operation or action. It is further obvious that various changes may be made in the details without departing from the spirit of this invention; it is therefore to be understood that this invention is not to be limited to the specific details described.

Having thus described the invention, what is claimed is:

1. A dry material for a mud-laden or drilling fluid, comprising, a finely divided, suspendable base, the particles of which are coated with hydratable bentonite.

2. A dry material for a mud-laden or drilling fluid, comprising, a finely divided, suspendable base, the particles of which are coated with a reversibly hydratable concentrated colloidal suspending agent.

3. A dry mud-weighting material, comprising, a finely divided, suspendable base of high specific gravity, the particles of which are coated with a hydratable bentonite.

4. A dry mud-weighting material, comprising, a finely divided suspendable base of high specific gravity, the particles of which are coated with a reversibly hydratable concentrated colloidal suspending agent.

5. In the art of drilling, the process of preparing a material for mud-laden or drilling fluids comprising, incorporating with hydrated particles of a finely divided suspendable base, a reversibly hydratable concentrated colloidal suspending agent and dehydrating and comminuting the product so formed.

6. In the art of drilling, the process of preparing a material for mud-laden or drilling fluids comprising, incorporating with hydrated particles a finely divided suspendable base of high specific gravity and reversibly hydratable concentrated colloidal suspending agent and dehydrating and comminuting the product so formed.

FREDERICK B. WILLIAMS.